United States Patent [19]

Makita

[11] Patent Number: 4,915,520
[45] Date of Patent: Apr. 10, 1990

[54] OUTPUT APPARATUS HAVING A TAB INTERVAL INCREASING/DECREASING FUNCTION

[75] Inventor: Masaru Makita, Tokyo, Japan

[73] Assignee: Canon Kabushiki Kaisha, Tokyo, Japan

[21] Appl. No.: 4,211

[22] Filed: Dec. 30, 1986

Related U.S. Application Data

[63] Continuation of Ser. No. 709,608, Mar. 8, 1985, abandoned.

[30] Foreign Application Priority Data

Mar. 12, 1984 [JP] Japan .................................. 59-45383

[51] Int. Cl.$^4$ ............................................. B41J 21/00
[52] U.S. Cl. ..................................... 400/279; 400/76; 400/342
[58] Field of Search ................... 400/76, 279, 342, 64, 400/294, 298, 343, 344, 345, 346, 347, 348, 351, 708, 708.1

[56] References Cited

U.S. PATENT DOCUMENTS

| | | | |
|---|---|---|---|
| 3,547,245 | 12/1970 | Okcuoglu et al. | 400/347 |
| 3,618,032 | 11/1971 | Goldsberry et al. | 400/279 X |
| 3,999,164 | 12/1976 | Kashio | 400/279 X |
| 4,031,996 | 6/1977 | Busch | 400/279 |
| 4,152,083 | 5/1979 | Kostoff, II | 400/342 |
| 4,169,685 | 10/1979 | Gruber | 400/279 X |
| 4,265,556 | 5/1981 | Krieg et al. | 400/279 X |
| 4,272,204 | 6/1981 | Quinn, Jr. et al. | 400/279 X |
| 4,408,915 | 10/1983 | Smith | 400/279 X |
| 4,448,557 | 5/1984 | Horn et al. | 400/279 |
| 4,500,216 | 2/1985 | Demonte et al. | 400/279 X |
| 4,540,299 | 9/1985 | Yamada | 400/342 X |
| 4,558,965 | 12/1985 | Ueda et al. | 400/144.2 |
| 4,564,304 | 1/1986 | Ueno | 400/279 |
| 4,615,631 | 10/1986 | Ueda et al. | 400/279 X |

FOREIGN PATENT DOCUMENTS

| | | | |
|---|---|---|---|
| 0120384 | 9/1981 | Japan | 400/342 |
| 0004789 | 1/1982 | Japan | 400/342 |
| 0630845 | 7/1982 | Switzerland | 400/298 |

OTHER PUBLICATIONS

IBM Technical Disclosure Bulletin, "Scaled Tab Storage in Multiple-Pitch Machines with Memory", Booth et al., vol. 22, No. 12, May. 1980, p. 5399.

Primary Examiner—Ernest T. Wright, Jr.
Attorney, Agent, or Firm—Fitzpatrick, Cella, Harper & Scinto

[57] ABSTRACT

An output apparatus for outputting information in accordance with a margin position and a tab position includes a device for changing a margin position, a memory for storing a tab position, and a device for deriving a new tab position for changing the tab position stored in the memory in association with the change of the margin position by the changing device, such that a balanced output layout is obtained.

32 Claims, 6 Drawing Sheets

OUTPUT APPARATUS HAVING A TAB INTERVAL INCREASING/DECREASING FUNCTION

This application is a continuation, of application Ser. No. 709,608 filed March 8, 1985 now abandoned.

BACKGROUND OF THE INVENTION

1. Field of the Invention

The present invention relates to an output apparatus which can be connected to a sentence/image editing apparatus or the like and, more particularly, to an output apparatus provided with a uniform increasing/decreasing function of a tab interval.

2. Description of the Prior Art

Hitherto, in the case of setting a format, for example, setting a tab position in an output apparatus of a sentence/image editing apparatus, e.g., a typewriter or the like, generally, a carriage is moved to a desired position of a paper using a space key and thereafter a tab set key or the like is pressed to store the position of the carriage.

However, in such a conventional tab position setting apparatus, the tab setting due to a change of the margin is not considered at all. In the case of decreasing or increasing the whole tab interval due to the change of the margin, it is necessary to reset the tab interval from the beginning after all of the stored tabs are cleared. This causes the user to easily make a mistake in the tabulating operation or the like and, therefore, simplification of the operation is strongly needed.

SUMMARY OF THE INVENTION

It is an object of the present invention to provide an output apparatus having formats with a large flexibility in consideration of the foregoing point.

Another object of the invention is to provide an output apparatus with a high operability in consideration of the foregoing point.

Still another object of the invention is to provide an output apparatus which is constituted in a manner such that an increase or decrease of the tab interval in association with the updating of the format, e.g., margin of the output apparatus is automatically performed and a new tab can be automatically set in consideration of the foregoing point.

Still another object of the invention is to change another output format in association with a change in output format in consideration of the foregoing point.

Still another object of the invention is to provide means for instructing the setting of the tab and means for newly calculating the tab position in association with a change in margin on the basis of an output of this instructing means in consideration of the foregoing point.

DETAILED DESCRIPTION OF THE PREFERRED EMBODIMENT

The invention will now be described in detail hereinbelow with reference to the drawings.

Figure 1:
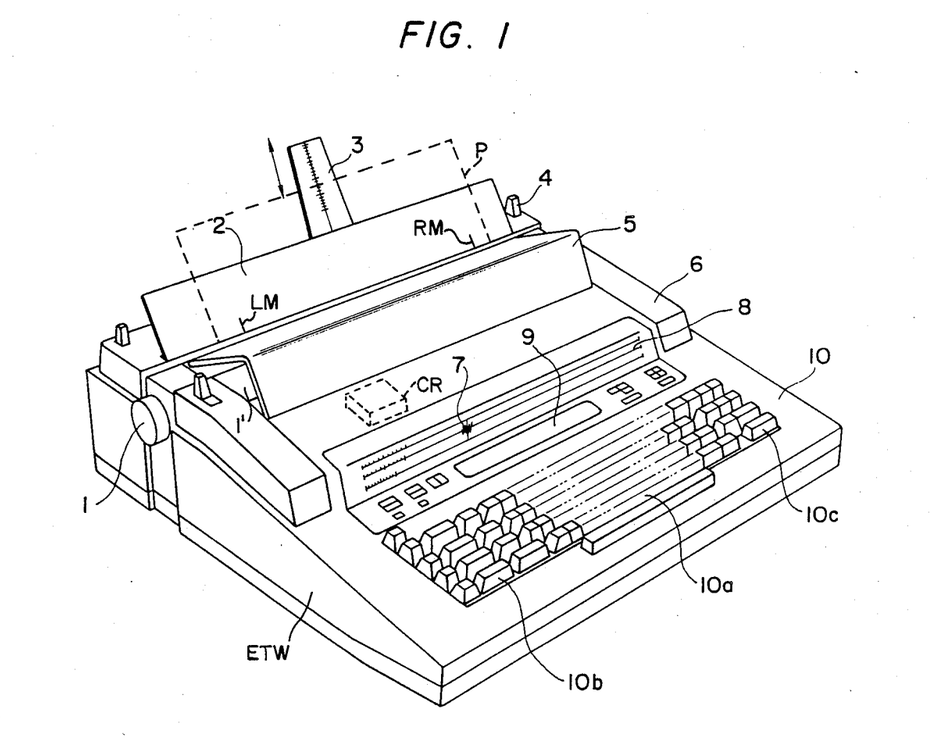
FIG. 1 is a perspective view of a typewriter in which the present invention is incorporated.
Figure 7:
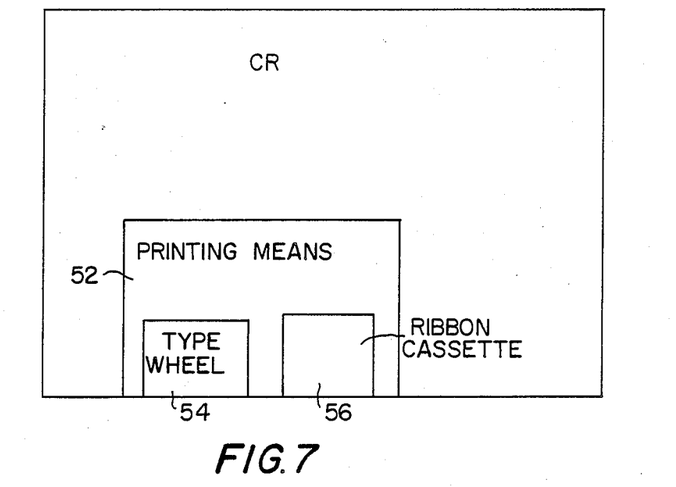
FIG. 7 is a block diagram of a carriage section of the present invention.
Figure 8:
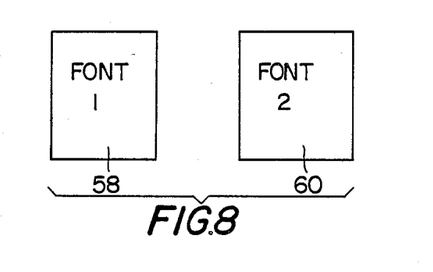
FIG. 8 is a block diagram of different fonts that can be used with the present invention.
Figure 9:
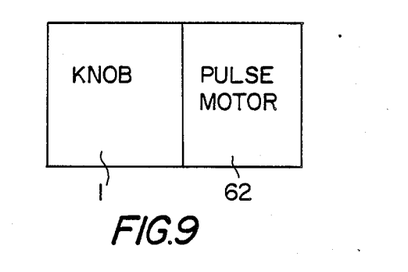
FIG. 9 is a block diagram of a platen knob and pulse motor of the present invention.

FIG. 1 is an external perspective view of an electronic typewriter (ETW) of an embodiment according to the present invention. In the diagram, a platen knob 1 is used to manually set a paper P or to finely adjust the printing position in the longitudinal direction. When the knob 1 is pressed inwardly, it is disconnected from an internal driving pulse motor 62 as shown in FIG. 9 so that the knob 1 can be manually rotated. A paper support 2 is a guide plate for a paper P and serves to allow the printing surface to face the operator even in the case where a thin paper is used. A page end indicator 3 is a scale to indicate the length to the end line of the paper P. The operator preliminarily adjusts the indicator 3 in the vertical direction as shown by an arrow in accordance with the longitudinal length of the paper P, thereby making it possible to know the length to the last line of the paper P when the top side of the paper P which came out from about a platen 1' reaches the scale position of the indicator 3. A release lever 4 is used to release the paper P from the platen 1' and thereby to manually correct the gradient of the paper P. A soundproof cover 5 serves to suppress the impact sound in impact printing. Since the soundproof cover 5 is formed of transparent acrylic resin, printed characters can be seen through this cover 5. In case of changing the fonts 58, 60, as seen in FIG. 8 or exchanging a ribbon cassette 56, as seen in FIG. 7, on the typewriter ETW, a top cover 6 is opened while rotating backwardly and a type wheel 54, as seen in FIG. 7 mounted on the carriage section CR is exchanged or the ribbon cassette 56 is exchanged. This electronic typewriter ETW has four kinds of print pitches in the transverse direction: namely, 10 characters per inch (hereinafter, abbreviated as CPI); 12 CPI; 15 CPI; and proportional spacing (hereinbelow, referred to as PS) in which the print pitch varies in accordance with the size of type. A scale 8 has three kinds of scales which were written at 10-CPI pitch, 12-CPI pitch and 15-CPI pitch. In response to the pitch designated by a keyboard 10, a lamp 7 is lit, thereby indicating the position of the carriage section CR (i.e., a carriage having thereon printing means 52, as seen in FIG. 7, for printing input character information on a scale 8. The keyboard 10 consists of a character key group 10a to input and print characters and control key groups 10b and 10c arranged on both sides of the character key group 10a. A numeral 9 denotes a display such as a CRT, LCD or the like which can display one to several lines.

Figure 2:
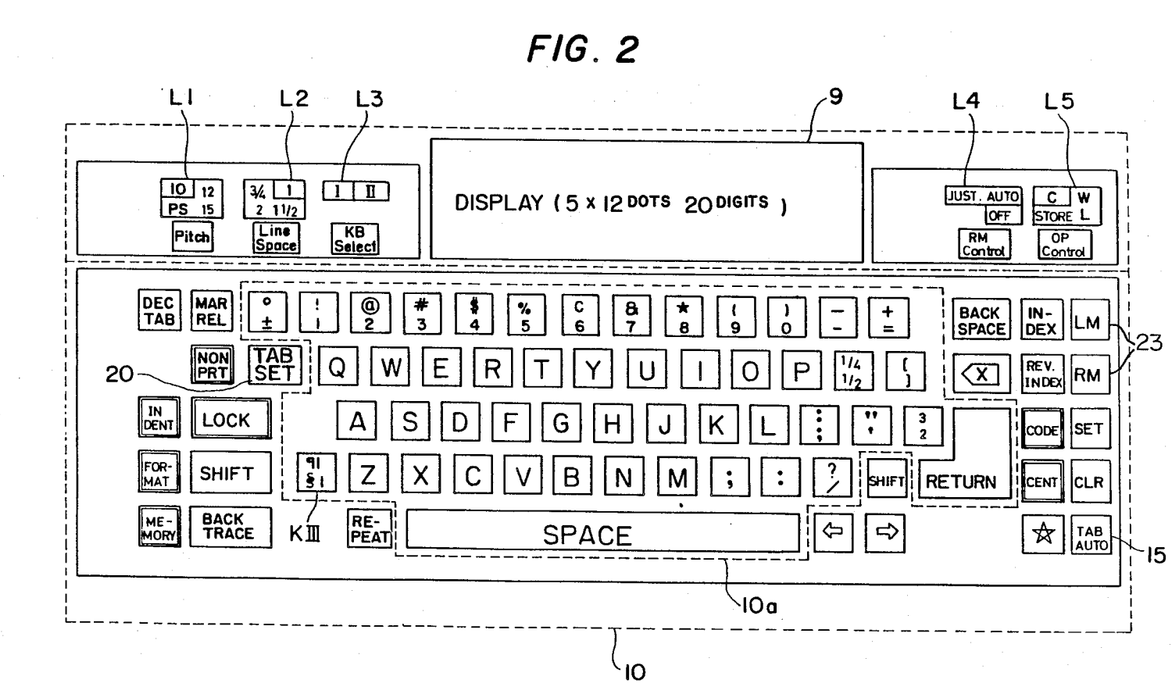
FIG. 2 is a diagram showing an operating section of the typewriter.

FIG. 2 is a front view of the operation panel of the electronic typewriter ETW. In the diagram, as mentioned above, a "Pitch" key is used to designate the number of print characters per inch. Whenever the "Pitch" key is pressed, a display section L1 which is constituted by lamps "10", "12", "15", and "PS" such as an LED or the like regarding the pitches sequentially and cyclically flickers in accordance with the sequence of 10, 12, 15, and PS. Each unit of 10, 12 and 15 denotes the number of characters per inch; however, in case of the PS, the number of characters per inch differs depending upon the characters to be printed. A "Line Space" key indicates a feed amount upon line feed and a fundamental unit length 1 of the feed amount is set to 1/6 inch. In this case also, depressing of the "Line Space" key causes a lamp L2 to cyclically flicker similarly to the lamps "10", "12", "15", and "PS" of display section L1. A "KB Select" key is used to give a selective meaning to a key K III by which a character cannot be selected even by use of a "SHIFT" key to designate capital letters, small letters or the like, namely, a key such as K III of which a single key corresponds to three kinds of types. The state of the KB Select key is indicated by a display L3. On one hand, an "RM (right margin) Control" key in the right upper portion serves to indicate the function of the electronic typewriter ETW at the right margin. Whenever the "RM Control" key is pressed, either one of JUST, AUTO and OFF is selected. This selection is indicated by the cyclic lighting of lamps L4. When a JUST lamp is lit, a right justification function is selected. When an AUTO lamp is lit, an auto line feed is performed. OFF indicates nothing as shown by the letters. An "OP Control" key is used to determine the printing mode of the electronic typewriter ETW. Whenever this "OP Control" key is pressed, either one of lamps C, W, L, and STORE in a display L5 is lit similarly to the above, thereby indicating the printing mode. C denotes printing on a character unit basis; W shows printing on a word unit basis; L indicates printing on a line unit basis; and STORE represents registration of data into an internal storage device (text buffer TB). In case of STORE, the apparatus enters the mode of printing L on a line unit basis. A "MEMORY" key is used to perform an operation on a character string (sentence) and to instruct the start of operation to the storage device TB. A margin release "MARREL" key serves to release the state in which further character key input is blocked at the right or left margin.

Figure 3:
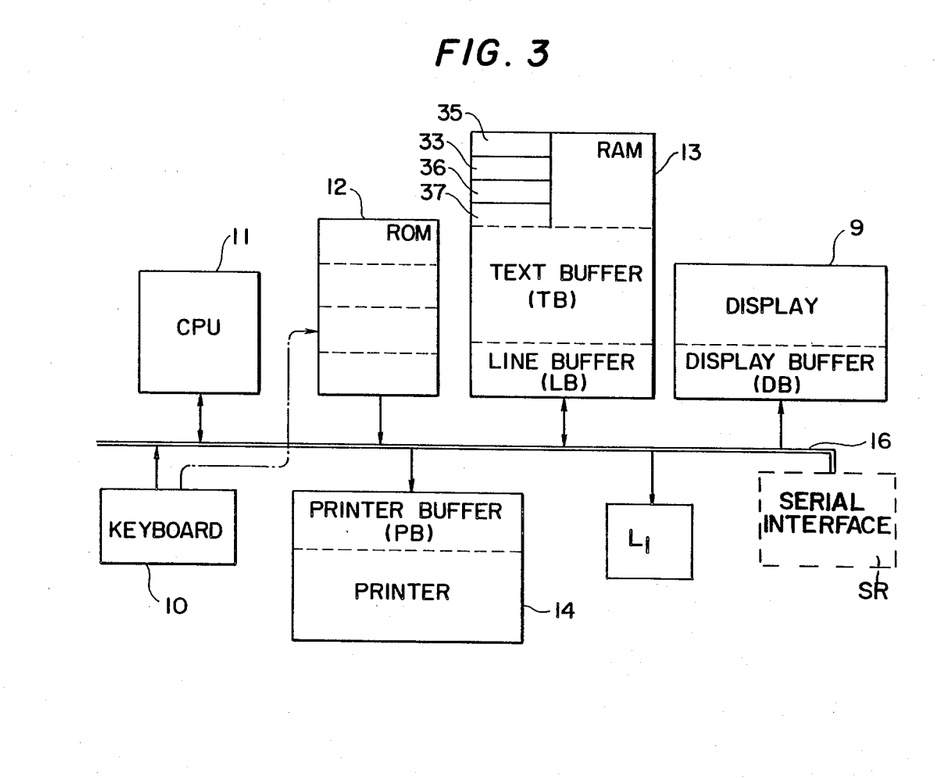
FIG. 3 is a block diagram showing an arrangement of the typewriter.

FIG. 3 is a block diagram of the electronic typewriter (ETW), in which the same parts and components as those shown in FIG. 1 are designated by the same reference numerals and their description are omitted.

In the diagram, a numeral 11 denotes a central processing unit (CPU) which performs the main control of the electronic typewriter (ETW); 12 is a ROM in which a program which is executed by the CPU 11 is stored; 13 is a RAM for temporarily storing the sentence data inputted by the keys 10a, data necessary for control of the typewriter ETW, and the like and has sections 33, 35, 36, 37, a text buffer TB and a line buffer LB; 14 is a printer to print the sentence data and has a printer buffer PB; and 16 is an internal common bus of the electronic typewriter ETW for connecting each of the foregoing components to the CPU 11. The display 9 may have a display buffer DB.

By connecting a serial interface SR to the internal common bus 16, a data communication with another typewriter ETW or the like can be also performed.

Figure 4:
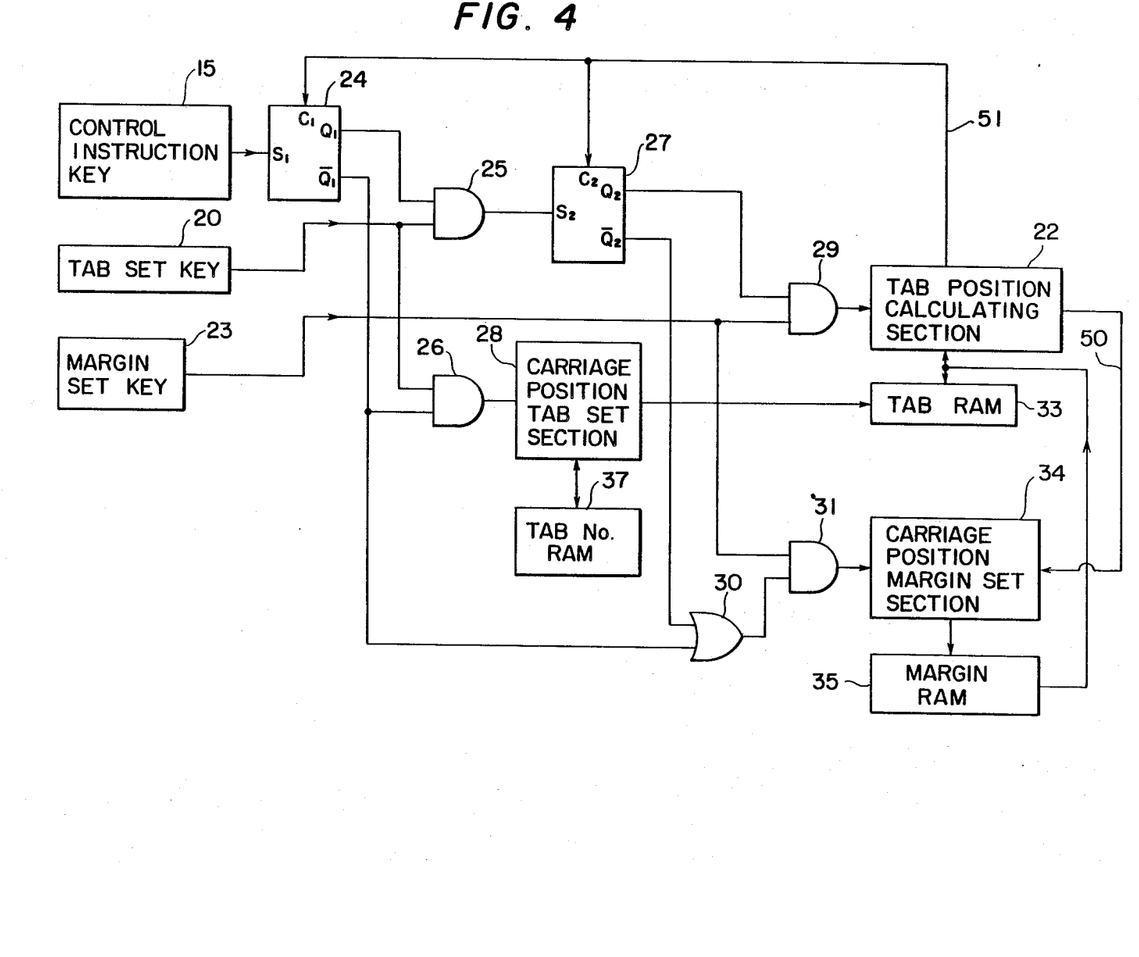
FIG. 4 is a block diagram for explaining the invention.

Next, FIG. 4 shows a block diagram for explaining the change regarding the tab position. It will be appreciated that it is obviously possible to process such a function due to a program. In the diagram, a numeral 15 denotes a control instruction key to change the function of a tab set key 20 and to instruct the automatic setting of the tab; 20 is the tab set key; 23 is a margin set key; 24 and 27 are flip flop circuits (hereinafter, referred to as FF); 25, 26, 29, and 31 are AND gates; and 30 is an OR gate.

In addition, a numeral 28 indicates a carriage position tab set section to set the tab with tab set key 20 at the carriage position in accordance with an output of the AND gate 26; 22 is a tab position calculating section to calculate a new tab position in accordance with an output of the AND gate 29 as explained later; 33 is a tab RAM (random access memory) to store the tab position set by the carriage position tab set section 28 or the tab position calculated by the tab position calculating section 22; 34 is a carriage position margin set section to set the margin (LM or RM in FIG. 1) at the carriage position in accordance with an output of the AND gate 31 and to store the new margin position in a margin RAM 35 after the tab position is calculated; 35 is the margin RAM to store the margin position set by the carriage position margin set section 34; and 51 is a line to reset the flip flops 24 and 27.

An input terminal $S_1$ of the FF 24 is connected to an output terminal of the control instruction key 15. An output terminal $Q_1$ of the FF 24 and an output terminal of the tab set key 20 are connected to input terminals of the AND gate 25. An output terminal of the AND gate 25 is connected to an input terminal $S_2$ of the FF 27. The output terminal of the tab set key 20 and an output terminal $\overline{Q_1}$ of the FF 24 are connected to input terminals of the AND gate 26. An output terminal of the margin set key 23 and an output terminal $Q_2$ of the FF 27 are connected to the AND gate 29. The output terminal $\overline{Q_1}$ of of the FF 24 and an output terminal $\overline{Q_2}$ of the FF 27 are connected to input terminals of the OR gate 30. The output terminal of the margin set key 23 and an output terminal of the OR gate 30 are connected to input terminals of the AND gate 31.

To update the margin position, the control instruction key 15 for instructing the change of the function of an ordinary tab set key 20 is pressed. By pressing the control instruction key 15, a high level signal is applied to the input terminal $S_1$ of the flip flop circuit 24. Thus, the output terminal $Q_1$ of the FF 24 becomes a high level and the output terminal $\overline{Q_1}$ becomes a low level. Next, when the tab set key 20 is pressed, both input signals to the AND gate 25 become a high level, so that the output signal thereof becomes a high level. Consequently, a high level signal is applied to the input terminal $S_2$ of the FF 27 and its output terminal $Q_2$ becomes a high level and its output terminal $\overline{Q_2}$ becomes a low level.

Next, depressing the margin set key 23 allows a high level signal to be supplied to the other input terminal of the AND gate 29, so that a high level signal is outputted from its output terminal.

This output signal of the AND gate 29 is supplied to the tab position calculating section 22. In response to the output signal of the AND gate 29, a comparing operation of the new margin which was newly set and the previous margin which has already been set in the margin RAM 35 is performed in the tab position calculating section 22. By dividing a change amount of the margin by the number of set tabs +1, the value for execution of addition or subtraction is obtained and the new tab position corresponding to each previous tab position is calculated in accordance with the value derived.

By replacing with this calculated value, the change of reduction or enlargement of the equal interval corresponding to the change amount of the margin set is performed with respect to the tab position stored in the tab RAM 33. This newly set tab position is the tab position in conformity with the format of the new margin which was set by the margin set key 23 and is automatically formed in response to the operation of the margin set key 23. These new tab positions stored in the tab RAM 33 are read out due to the subsequent printing operation.

For instance, in the case where the margin positions are set as follows $$M1=10, M2=50$$

and the tab positions are set as follows $$T1=20, T2=30, T3=40$$

where, a unit of numerals represents the digit number, if the margin positions are changed as follows $$M1'=0, M2'=60,$$

we will have $$k = \frac{\text{change amount of margin}}{\text{tab set position} + 1} = \frac{(M2' - M1') - (M2 - M1)}{4}$$

$$= \frac{20}{4} = 5$$

where, k is an increase or decrease amount of the tab interval. Therefore, the new tab positions T1', T2' and T3' due to the automatic change are calculated in a manner as explained below.

$$
\begin{aligned}
T1' &= \text{new margin position} + \text{previous tab interval} + \\
&\quad \text{increase or decrease amount} \\
&= M1' + (T1 - M1) + k \\
&= 0 + 10 + 5 = 15 \\
T2' &= \text{new tab position immediately before} + \\
&\quad \text{previous tab interval} + \text{increase or} \\
&\quad \text{decrease amount} \\
&= T1' + (T2 - T1) + k \\
&= 15 + 10 + 5 = 30 \\
T3' &= T2' + (T3 - T2) + k \\
&= 30 + 10 + 5 = 45
\end{aligned}
$$

On the other hand, even in the case where the previous tab intervals are not constant, each of the previous tab intervals may be calculated using the RAM 13.

Further, in the case where the margin positions are set such that M1'=20 and M2'=40 under the same condition, k equals −5; therefore, the new tab positions are calculated in the following manner.

$$
\begin{aligned}
T1' &= M1' + (T1 - M1) + k \\
&= 20 + (20 - 10) - 5 = 25;
\end{aligned}
$$

likewise, T2'=30 and T3'=35 are obtained.

In this way, according to this example, the uniform increase or decrease of the tab interval can be automatically performed in response to the change of the margin position and the new tabs are automatically set at the proper positions.

The output signal from the output terminal $\overline{Q}_1$ of the FF 24 and the output signal from the tab set key 20 are transmitted to the carriage position tab set section 28 through the AND gate 26. Due to this, by pressing only the tab set key 20 instead of pressing the control instruction key 15, it is possible to accomplish an ordinary tab setting function to set the tab at the present position of the carriage section CR.

Figure 5:
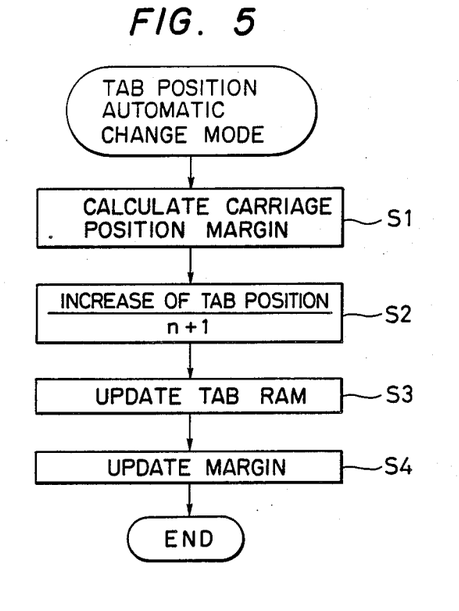
FIG. 5 is a flowchart for explaining the automatic changing mode of a tab position.
Figure 6:
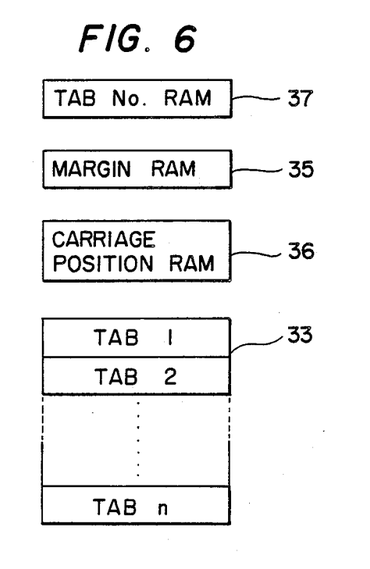
FIG. 6 is an explanatory diagram of a RAM.

The foregoing automatic change of the tab position will now be further described. FIG. 5 is a flowchart and FIG. 6 is an explanatory diagram of the RAM 13. A RAM 37 for storage of a tab number is a memory having a capacity as great as two bytes and is updated whenever the tab is set and is one area in the RAM 13 in FIG. 3. A RAM 36 for a carriage position is also a memory having a capacity as great as two bytes and is one area in the RAM 13 in FIG. 3. Although the RAM 36 is not shown in FIG. 4, it serves to store the carriage position and is used with regard to the tab position calculating section 22 and carriage position margin set section 34 in FIG. 4. A numeral 35 denotes the margin RAM which is a memory having a capacity as great as two bytes and 33 is the tab RAM for storing the positions of the tab 1, tab 2, . . . . , tab n in correspondence to the tab number n in the RAM 37 for storage of the tab number.

In step S1 in FIG. 5, the previous and new margin positions (M1, M2, M1', M2') are calculated due to the carriage position RAM 36 and margin RAM 35. In step S2, the increase or decrease amount is calculated. When it is assumed that the increase amount is (M2'−M1')−(M2−M1) and the tab positions are T1, T2, . . . . , Tn, the increase/decrease amount of the tab position of T1 becomes the increase amount/1+1. Similarly, the increase amount/n+1 regarding the tab position of Tn is calculated. Thereafter, in step S3, the new tab position is stored in the tab RAM 33. Then, the new margin is inputted to the carriage position margin set section 34 through a line 50, thereby updating the margin RAM 35 (step S4).

The RAM 33 for storing the positions of the tab and the like is constituted so as to update the positions, for instance, for every 24/240 inch assuming that the output mode is the 10-CPI pitch. On one hand, the tabs and the like may be stored using the margins as references. However, the distance from the leftmost end of the platen 1' is always stored as the absolute amount.

What is claimed is:

1. An output apparatus for outputting information in accordance with format information, said apparatus comprising:
    setting means for setting output format information including a margin;
    storage means for storing format information set by said setting means; and
    deriving means for, when the margin is changed, deriving new format information including a tab position such that a balanced output layout is obtained and for causing said storage means to store the new format information.

2. An output apparatus according to claim 1, wherein said setting means is a margin set key and a tab set key.

3. An output apparatus according claim 2, wherein the format information includes at least one tab position and wherein said deriving means calculates at least one of an increase and a decrease amount of the tab position stored in said storage means.

4. An output apparatus according to claim 1, wherein said storage means stores position information such as margin and tab information.

5. An output apparatus according to claim 1, further comprising means for setting pitch information, wherein said deriving means derives the new format on the basis of the pitch information set by said pitch information setting means.

6. An output apparatus according to claim 1, wherein the new format information can be set for the same margin information.

7. An output apparatus for outputting information in accordance with a margin position and a tab position, said apparatus comprising:
changing means for changing a margin position;
storage means for storing a tab position; and
deriving means for deriving a new tab position for changing the tab position stored in said storage means in association with the change of the margin position by said changing means, such that a balanced output layout is obtained.

8. An output apparatus according to claim 7, wherein said changing means is a margin set key.

9. An output apparatus according to claim 7, wherein said storage means changes said stored tab position to the new tab position derived by said deriving means and stores said new tab position.

10. An output apparatus according to claim 7, further comprising means for setting pitch information, wherein said deriving means derives the new tab position on the basis of the pitch information set by said pitch information setting means.

11. An output apparatus according to claim 7, wherein the new tab position can be set for the same margin information.

12. An output apparatus for outputting information in accordance with margin positions and tab positions, said apparatus comprising:
margin position storage means for storing a pair of changeable margin positions;
tab position storage means for storing a plurality of changeable tab positions; and
tab position deriving means which, when said margin positions are changed, resets said tab positions by calculating a value obtained by dividing an amount by which said margin positions are changed by a value equal to the number of set tab positions plus one, and which thereby updates the content of said tab position storage means, such that a balanced output layout is obtained.

13. An output apparatus according to claim 12, wherein after said tab position deriving means derives new tab positions, said changed margin positions are stored in said margin position storage means.

14. An output apparatus according to claim 12, further comprising counting means for counting the set number of set tab positions.

15. An output apparatus according to claim 12, further comprising means for setting pitch information, wherein said deriving means derives the new tab position on the basis of the pitch information set by said pitch information setting means.

16. An output apparatus for outputting information in accordance with at least one margin position and at least one settable tab position, said apparatus comprising:
setting means for setting a margin position;
instructing means for instructing that a tab position has been set; and
deriving means which, in the case where the tab position has been set on the basis of information from said instructing means, when said margin position is changed by said setting means, derives tab position information so as to also change said tab position on the basis of said margin position which is newly set, such that a balanced output layout is obtained.

17. An output apparatus according to claim 16, wherein said setting means is a key.

18. An output apparatus according to claim 16, wherein an output of said instructing means is on when the tab position has been set.

19. An output apparatus according to claim 16, wherein when a change of margin is performed by said setting means and further said instructing means instructs that the tab position has been set, said deriving means performs a process to change said tab position.

20. An output apparatus according to claim 16, further comprising means for setting pitch information, wherein said deriving means derives the new tab position on the basis of the pitch information set by said pitch information setting means.

21. An output apparatus according to claim 16, wherein the new tab position can be set for the same margin information.

22. An output apparatus for outputting information in accordance with at least one margin position and at least one settable tab position, said apparatus comprising:
a carriage section having thereon printing means for printing input character information;
display means for displaying a printing position corresponding to movement of said carriage section;
means for setting a margin position at the printing position of said carriage section displayed by said display means;
means for setting a tab position at the printing position of said carriage section displayed by said display means;
deriving means for deriving tab position information so as to also change the tab position on the basis of the margin position which is newly set when the margin position is changed by said margin position setting means; and
control means for controlling the movement of said carriage section inside the newly set margin position on the basis of the newly set tab position.

23. An output apparatus according to claim 22, further comprising memory means for storing a tab position set by said tab position setting means.

24. An output apparatus according to claim 22, further comprising memory means for storing a tab position wherein said memory means stores a changed tab position when the margin is changed.

25. An output apparatus according to claim 22, further comprising means for setting pitch information, wherein said deriving means derives the new tab position on the basis of the pitch information set by said pitch information setting means.

26. An output apparatus according to claim 22, wherein the new tab position can be set for the same margin information.

27. An output apparatus for outputting information in accordance with format information, said apparatus comprising:

setting means for setting output format information including a margin;

storage means for storing format information set by said setting means;

decision means for deciding whether the format information should be updated when the margin is changed; and deriving means for deriving new format information on the basis of the decision by said decision means and for permitting said storage means to store the new format information, such that a balanced output layout is obtained.

28. An output apparatus according to claim 27, wherein said setting means is a margin set key and a tab set key.

29. An output apparatus according to claim 27, wherein the format information includes at least one tab position and wherein said deriving means calculates at least one of an increase and a decrease amount of the tab position stored in said storage means.

30. An output apparatus according to claim 27, wherein said storage means stores position information such as margin and tab information.

31. An output apparatus according to claim 27, further comprising means for setting pitch information, wherein said deriving means derives the new format on the basis of the pitch information set by said pitch information setting means.

32. An output apparatus according to claim 27, wherein the new format information can be set for the same margin information.

* * * * *

UNITED STATES PATENT AND TRADEMARK OFFICE
CERTIFICATE OF CORRECTION

PATENT NO. : 4,915,520

DATED : April 10, 1990

INVENTOR(S) : Masaru MAKITA

It is certified that error appears in the above-identified patent and that said Letters Patent is hereby corrected as shown below:

<u>COLUMN 2</u>:

Line 53, "information" should read --information)--; and

Line 54, "a scale 8" should read --the scale 8--.

Signed and Sealed this

Third Day of November, 1992

*Attest:*

DOUGLAS B. COMER

*Attesting Officer*    *Acting Commissioner of Patents and Trademarks*